United States Patent
Jiang et al.

(10) Patent No.: US 6,304,759 B1
(45) Date of Patent: Oct. 16, 2001

(54) METHOD FOR EXTENDING THE RANGE OF A WIRELESS COMMUNICATION SYSTEM

(75) Inventors: Frances Jiang, Whippany; Wen-Yi Kuo, Parsippany, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/144,241

(22) Filed: Aug. 31, 1998

(51) Int. Cl.[7] .................. H04B 7/005; H04B 7/216; H04J 3/06; A61F 2/06
(52) U.S. Cl. .................. 455/502; 370/350; 370/335; 370/337; 370/508; 375/149; 375/145; 375/142
(58) Field of Search .................. 455/502, 67.6, 455/423; 370/324, 350, 508, 335, 342, 337, 328, 519; 375/140, 145, 149

(56) References Cited

U.S. PATENT DOCUMENTS

| | | | |
|---|---|---|---|
| 5,103,459 | 4/1992 | Gilhousen et al. | 375/2 |
| 5,544,171 | * 8/1996 | Godecker . | |
| 5,642,355 | * 6/1997 | Smith | 370/337 |
| 5,710,768 | 1/1998 | Ziv et al. | 370/342 |
| 5,822,314 | * 10/1998 | Chater-Lea | 370/337 |
| 5,839,071 | * 11/1998 | Johnson | 370/331 X |
| 5,872,774 | * 2/1999 | Wheatley, III et al. | 370/335 |
| 5,881,058 | * 3/1999 | Chen | 370/335 |
| 5,907,813 | * 5/1999 | Johnson, Jr. et al. | 455/502 |
| 5,959,980 | * 9/1999 | Scott | 370/280 |

FOREIGN PATENT DOCUMENTS

| | | | |
|---|---|---|---|
| 0564429A2 | 10/1993 | (EP) | H04Q/7/00 |
| 0653893A1 | 11/1994 | (EP) | H04Q/7/20 |
| WO95/02306 | 1/1995 | (WO) | H04Q/7/30 |

* cited by examiner

*Primary Examiner*—Tracy Legree

(57) ABSTRACT

A method for extending a cell radius or access range of a base station without incurring ASIC correlator re-design. This is accomplished using a modified timing protocol that will cause signals transmitted by mobile-telephones positioned beyond the limitations of the ASIC correlator bit limitation to be received within a search window so the signals may be detected and demodulated. In one embodiment, the modified timing protocol incorporates a timing advance technique in which the base station transmits its signals at an advanced time before frame boundaries such that signals transmitted by out-of-range mobile-telephones can be received within a search window beginning at a frame boundary and spanning a time interval corresponding to the ASIC correlator bit limitation. In another embodiment, the modified timing protocol incorporates a shifted search window that begins at an advanced time after a frame boundary and spans a time interval corresponding to the ASIC correlator bit limitation.

23 Claims, 5 Drawing Sheets

METHOD FOR EXTENDING THE RANGE OF A WIRELESS COMMUNICATION SYSTEM

FIELD OF THE INVENTION

The present invention relates generally to wireless communications systems and, in particular, to extending access ranges of wireless communications systems.

BACKGROUND OF THE INVENTION

FIG. 1 depicts a wireless communications system 10 employing Code Division Multiple Access (CDMA) techniques based on the well-known IS-95 standard of the Telecommunication Industrial Association. The wireless communications system 10 comprises a mobile switching center (MSC) 12 and a plurality of base stations (BS) 14-i connected to the MSC 12. Each of BS 14-i provides wireless communications services to mobile-telephones (MT), such as mobile-telephones 16-k, within an associated geographical coverage area referred to herein as cell 18-i with a radius $R_i$. For illustrative purposes, cells 18-i are depicted as circular in shape with base stations 14-i centrally positioned. It should be understood that cells 18-i may also be non-circular in shape (e.g., hexagonal) with the base stations positioned non-centrally, and that the term "radius $R_i$" should be construed to define a distance between the base station and a point on the circumference of cell 18-i (which will vary depending on the particular point on the circumference).

Each base station 14-i includes radios and antennas for modulating and transmitting base station signals to mobile-telephones, and for receiving and demodulating mobile-telephone signals from mobile-telephones within its associated cell 18-i. Each base station 14-i further includes a receiver for receiving timing information using the well-known Global Positioning Satellites (hereinafter referred as a "GPS receiver").

Signals are transmitted by base stations 14-i and mobile-telephones in accordance with a timing protocol aligned with GPS time using the GPS receiver. FIG. 2 depicts a timing schedule 20 incorporating an implementation of a timing protocol based on the IS-95 standard. The timing schedule 20 comprises a series of frames 22-n, wherein each frame 22-n spans a time interval t. The beginning of each frame 22-n is marked by a frame boundary at time $T_n$ aligned to GPS time. In accordance with the timing protocol, base stations 14-i are configured to begin transmitting base station signals at the frame boundaries, wherein the base station signals include zero or more information bearing signals and a pilot signal for coherent demodulation of the information bearing signals by the mobile-telephones and system access operations. By contrast, mobile-telephones 16-k are configured to begin transmitting mobile-telephones signals at some multiple x of a frame time period (i.e., tx) after mobile-telephones 16-k began receiving base station signals, where x is some integer greater than or equal to zero. Unlike base station signals, mobile-telephone signals include one or more information bearing signals and no pilot signal, and are encoded using a set of orthogonal codes (referred to as Walsh codes) combined with a pseudo-noise (PN) sequence (or a known code) such that the information bearing signal may be non-coherently demodulated. The PN sequence comprises random 0 and 1 digital signals, wherein the duration for a 0 or 1 to transmit is referred to herein as a PN chip.

The above described timing protocol will now be discussed in reference to FIG. 3, which depicts a time chart 28 illustrating a sequence of transmissions and receptions by base station 14-i and mobile-telephone 16-k. At time $T_1$, BS 14-i begins transmitting base station signal $S_1$ to MT 16-k, which may be located anywhere in cell 18-i. MT 16-k begins receiving signal $S_1$ at time $T_1+d_{BS \to MT}$, where $d_{BS \to MT}$ is a propagation delay from BS 14-i to MT 16-k. Note that the term propagation delay includes line-of-sight and non-line-of-sight propagation delays.

MT 16-k will wait a time interval tx from when MT 16-k began receiving signal $S_1$ before it begins transmitting mobile-telephone signal $S_2$. Thus, MT 16-k will begin transmitting signal $S_2$ at time $T_1+d_{BS \to MT}+tx$ (or time $d_{BS \to MT}$ after some frame boundary). For example, if x=2, then MT 16-k transmits signal $S_2$ at time $T_3+d_{BS \to MT}$ (or two frames after receiving the base station signal $S_1$).

Due to a propagation delay $d_{MT \to BS}$ from MT 16-k to BS 14-i, BS 14-i will begin receiving signal $S_2$ at time $T_1+d_{BS \to MT}+tx+d_{MT \to BS}$. For ease of discussion, it is assumed that the propagation delay $d_{MT \to BS}$ from MT 16-k to BS 14-i is the same as the propagation delay $d_{BS \to MT}$, and both will hereinafter be referred to individually as a one way propagation delay $d_{ow}$, i.e., $d_{ow}=d_{MT \to BS}=d_{BS \to MT}$, or collectively as a round trip propagation delay $2d_{ow}$. Thus, BS 14-i will begin receiving signal $S_2$ at time $T_1+tx+2d_{ow}$.

In order to demodulate the received signal $S_2$, BS 14-i must first detect signal $S_2$. Each radio includes a correlator, which is a device that detects mobile-telephone signals. For example, the correlator detects mobile-telephone signal $S_2$ by multiplying an incoming signal by the PN sequence, where the PN sequence is time shifted in discrete steps over a period or time interval (referred to herein as a search window $W_n$) until the resulting product (of the PN sequence and the incoming signal) exceeds a threshold indicating the detection of mobile-telephone signal $S_2$. If BS 14-i does not begin to receive signal $S_2$ within the confines of a search window $W_n$, BS 14-i will not be able to detect signal $S_2$ (using the timing protocol incorporated in FIG. 2).

To ensure that BS 14-i begins receiving signal $S_2$ within the confines of search windows $W_n$, search windows $W_n$ should span time intervals that include possible arrival times for signal $S_2$ (traveling a straight line or line-of-sight path between the mobile-telephone and the base station) regardless of the position of mobile-telephone 16-k in cell 18-i. Based on the above described timing protocol, base station 14-i can expect to receive signal $S_2$ no earlier than the frame boundary and no later than time $2d_{ow\text{-}radius}$ after the frame boundary, where $d_{ow\text{-}radius}$ is the one way propagation delay (or $2d_{ow\text{-}radius}$ is the round trip propagation delay) for a signal traveling a distance equal to the radius $R_i$. Thus, search windows $W_n$ should span a duration of at least $2d_{ow\text{-}radius}$ beginning at time $T_n$ and ending no earlier than time $T_n+2d_{ow\text{-}radius}$. In effect, the duration of search windows $W_n$ restricts the effective radius (or size) of cell 18-i, which is also referred to herein as the access range of a base station.

The duration of search windows $W_n$ depends on the implementation of the correlator. Typically, correlators are implemented in the form of an Application Specific Integrated Circuit (hereinafter referred to as an "ASIC correlator") having a predetermined number of bits (also referred to herein as a "bit limitation") for representing a round trip delay (of a signal traveling from the base station to the mobile-telephone and back to the base station). Such bit limitation limits the duration of the search windows which, as discussed above, limits the effective size of cell 18-i or access range of the base station 14-i. As long as the bit limitation does not limit search windows $W_n$ to a duration of less than $2d_{ow\text{-}radius}$, base station 14-i should be able to detect signal $S_2$ transmitted by any mobile-telephone located anywhere within its cell 18-i (assuming that $R_i$ is the same for all points on the circumference).

Typical implementations of base stations in an IS-95 based CDMA wireless communications system include an ASIC correlator having a 12-bit limitation for representing the round trip delay. In order to have fine resolution of delay, a typical value of ⅛ PN chip is used as the minimum resolution unit. The 12-bit limitation (or round trip delay representation) in units of ⅛ PN chips yields a range of 512 PN chips (i.e., $2^{12}$ bits×⅛ PN chips/bits). For a transmit bandwidth of 1.2288 MHz (which is typical for an IS-95 based CDMA wireless communications system), the 12-bit limitation can represent a round trip delay of 416 $\mu$s (i.e., 512 PN chips÷1.2288 PN chips/$\mu$s). With air propagation speed of 5.33 $\mu$s/mile, the 416 $\mu$s round trip delay (or 208 $\mu$s one way delay) represents the limitation that if a mobile-telephone is located approximately 39 miles (i.e., 208 $\mu$s÷5.33 $\mu$s/mile) from the base station, the mobile-telephone is capable of communicating with the base station if the radio path loss is acceptable and the search window is configured correctly - that is, the 12-bit limitation (or 512 time chip delay index representation) allows for a cell with a maximum radius $R_i$ (or a maximum round trip delay) of approximately 39 miles. A signal transmitted by a mobile-telephone beyond 39 miles of BS 14-i, in accordance with the prior art timing protocol, may not arrive at BS 14-i within the confines of any search windows $W_n$ and, thus, will not be reliably detectable with the 12-bit ASIC correlator.

Presently, if the cell size or access range is to be extended beyond the 12-bit limitation of the ASIC correlator (i.e., beyond 39 miles), the ASIC correlator would have to be re-designed. Specifically, the ASIC correlator would have to be re-designed to increase its bit limitation such that signals transmitted by mobile-telephones positioned beyond the access range 12-bit limitation of the ASIC correlator may also be detected. ASIC correlator re-design, however, is undesirable and may not be economical for small scale of applications. Therefore, there exist a need to extend the cell size or access range of the base station without incurring the high costs associated with ASIC correlator re-design.

SUMMARY OF THE INVENTION

The present invention is a method for extending a cell size or access range without incurring ASIC correlator re-design. This is accomplished using a modified timing protocol that will cause search windows and/or base station transmission times to shift with respect to frame boundaries, thereby causing signals transmitted by mobile-telephones positioned beyond the bit limitation of the ASIC correlator to be received within the search windows. Specifically, the modified timing protocol involves transmitting base station signals at some time q and q+p before search windows begin and end, respectively, wherein q represents a timing advance value and p represents a time interval corresponding to the ASIC correlator bit limitation. In one embodiment, the modified timing protocol incorporates a timing advance technique in which the base station transmits its signals at time q before frame boundaries such that signals transmitted by mobile-telephones (beyond the access range) can be received within a search window beginning at a frame boundary and ending no later than a time p after the frame boundary. In another embodiment, the modified timing protocol incorporates a shifted search window that begins at time q after a frame boundary and ends no later than a time q+p after the frame boundary.

BRIEF DESCRIPTION OF THE DRAWINGS

The features, aspects, and advantages of the present invention will become better understood with regard to the following description, appended claims, and accompanying drawings where:

DETAILED DESCRIPTION

Figure 1:
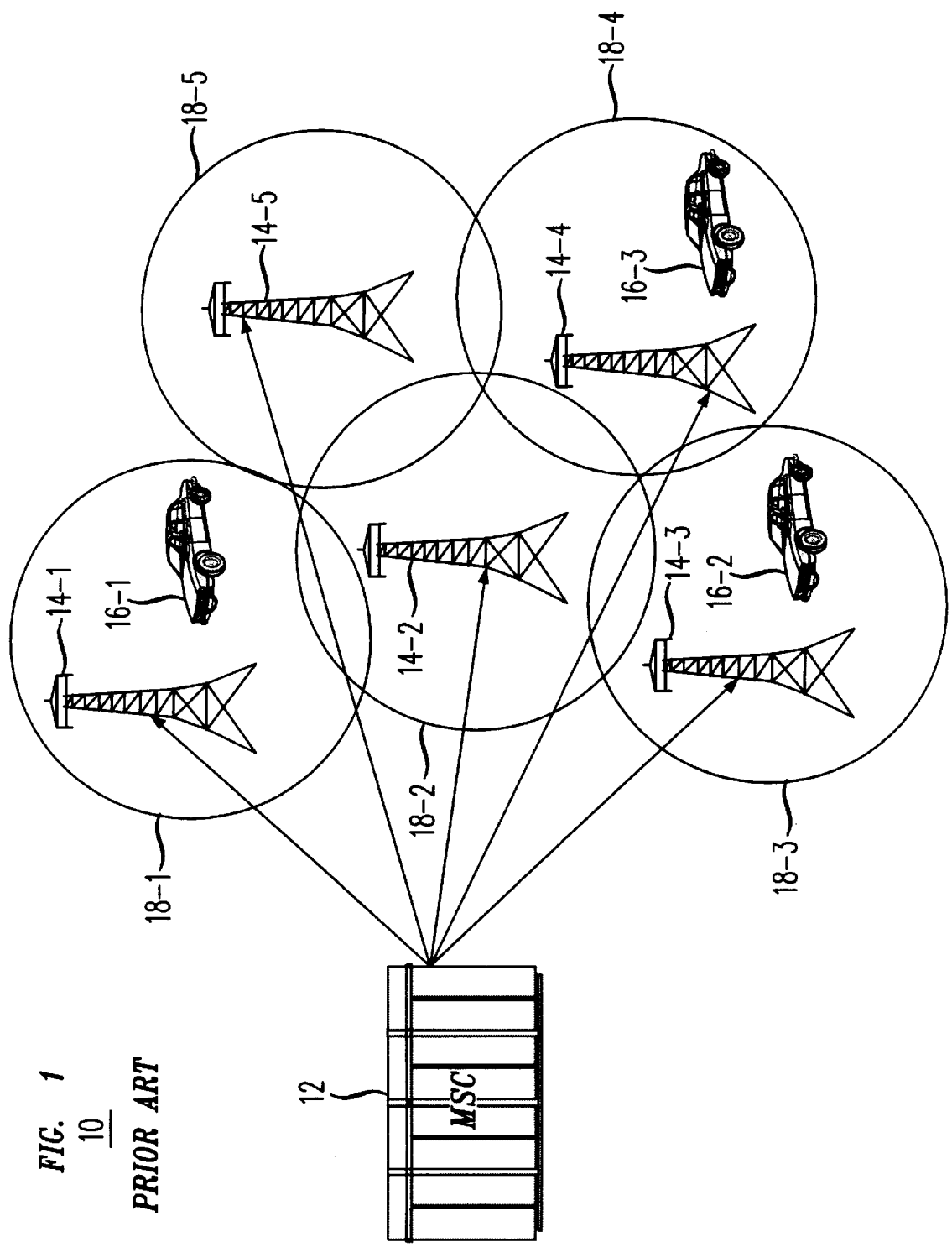
FIG. 1 depicts a wireless communications system employing Code Division Multiple access (CDMA) techniques based on the well-known IS-95 standard.
Figure 2:
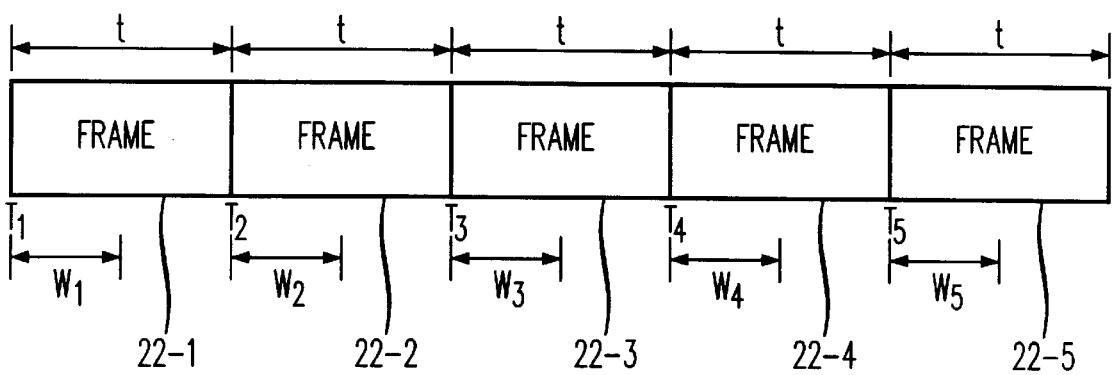
FIG. 2 depicts a timing schedule used in accordance with one implementation of a timing protocol based on the IS-95 standard.
Figure 3:
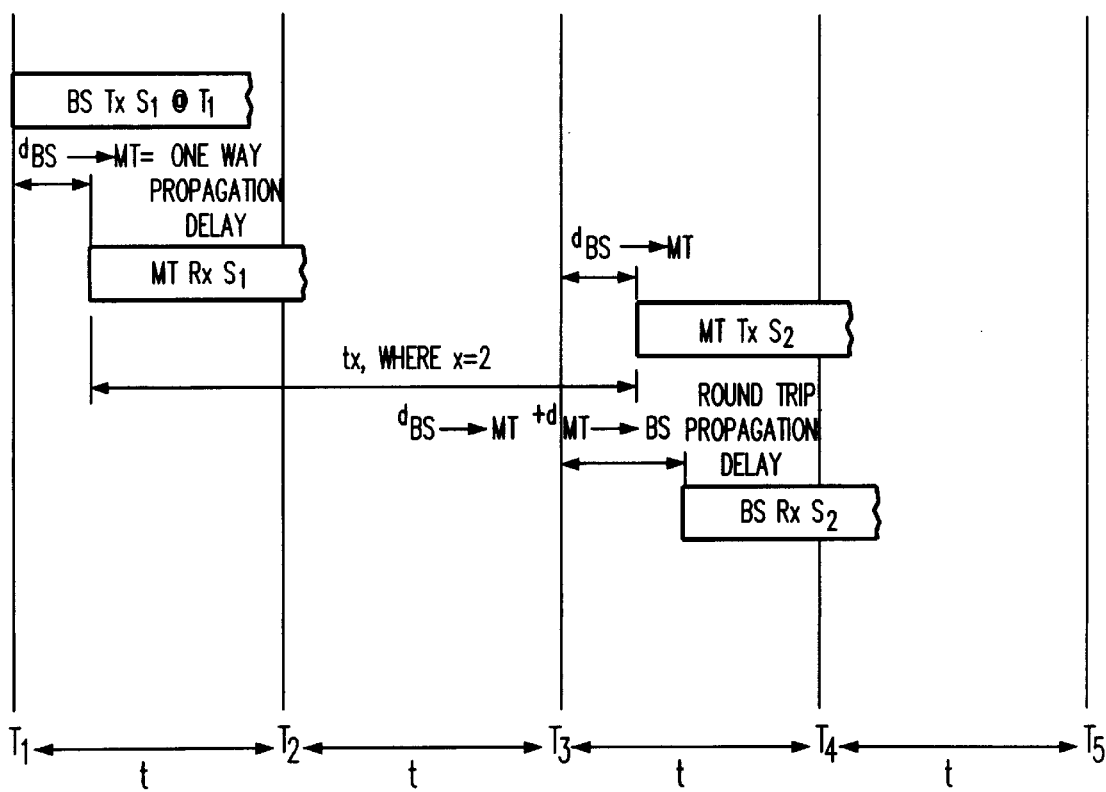
FIG. 3 depicts a time chart illustrating a sequence of transmissions and receptions by base station and mobile-telephone in accordance with the timing schedule of FIG. 2.
Figure 4:
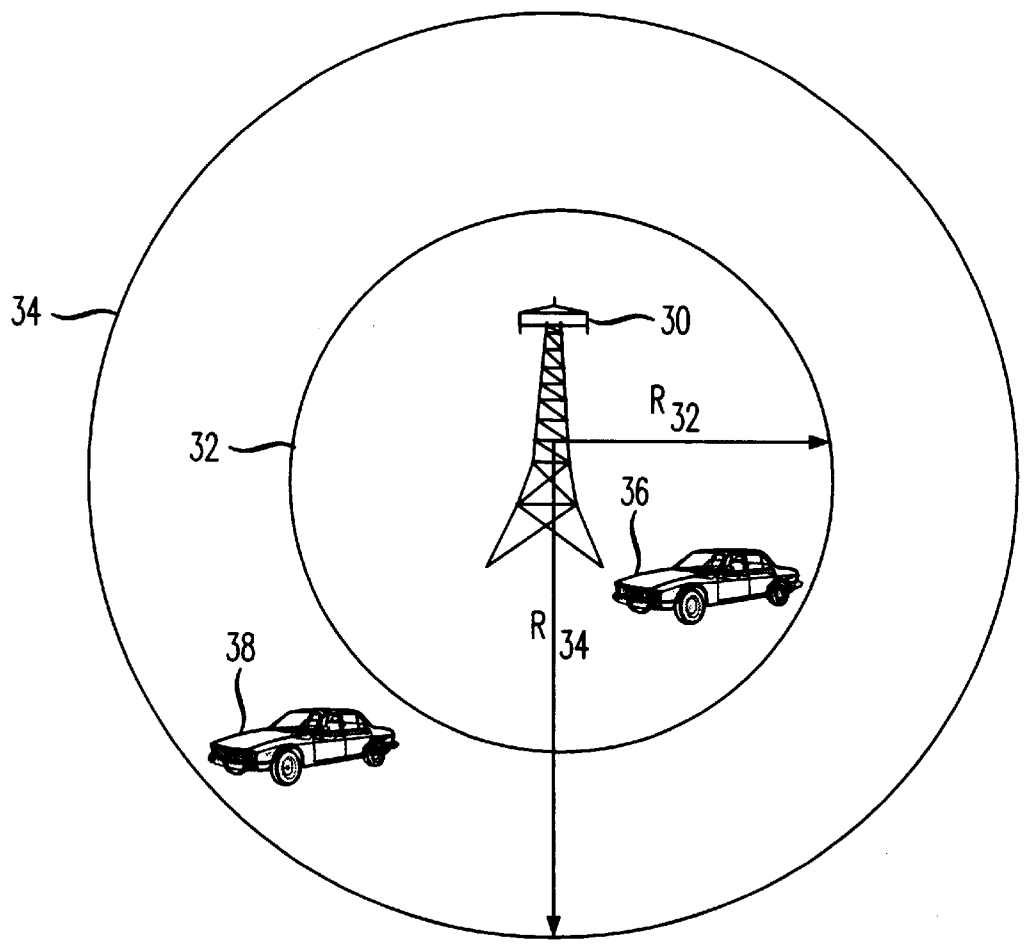
FIG. 4 depicts a base station based on the well-known IS-95 standard for Code Division Multiple Access used in accordance with the present invention.

FIG. 4 depicts a base station 30 based on the well-known IS-95 standard for Code Division Multiple Access used in accordance with the present invention. Base station 30 includes radios and antennas for modulating and transmitting base station signals to mobile-telephones and for receiving and demodulating mobile-telephone signals from mobile-telephones within cell 34, and a GPS receiver for receiving timing information using the well-known Global Positioning Satellites. Each radio includes a correlator implemented in the form of an ASIC (hereinafter referred to as an "ASIC correlator") operable to detect mobile-telephone signals such that the mobile-telephone signals may be demodulated.

For purposes of discussion, the ASIC correlator has a 12-bit limitation (or 512 PN chips) for representing a round trip delay (of a signal traveling from base station 30 to a mobile-telephone and back to base station 30), as described in the background section. This should not be construed to limited the present invention to ASIC correlators with 12-bit limitations. It will be clear to one of ordinary skill in the art that the present invention is equally applicable to base stations having ASIC correlators with other bit limitations or correlators implemented in a form other than an ASIC. A 12-bit (or 512 PN chips) ASIC correlator has a search window $W_n$ of approximately 416 $\mu$s in duration. In prior art CDMA wireless communications systems using a timing protocol based on the IS-95 standard, such search window $W_n$ is configured to begin at time $F_n$ (marking the beginning of frames) and end at time $F_n+416$ $\mu$s, and would allow base station 30 to detect a signal transmitted from mobile-telephones located within approximately 39 miles of base station 30. Thus, a mobile-telephone beyond 39 miles of base station 30 would be considered beyond the access range of base station 30 equipped with a 12-bit ASIC correlator.

Cell 34 has an outer radius $R_{outer}$ (or $R_{34}$) and an inner radius $R_{inner}$ (or $R_{32}$), wherein outer radius $R_{outer}$ may be or is a distance beyond the access range of the ASIC correlator bit limitation (e.g., $R_{outer}$>39 miles for an ASIC correlator with a 12-bit limitation), inner radius $R_{inner}$ is less than $R_{outer}$, and the difference $\Delta R$ between radii $R_{outer}$ and $R_{inner}$ should be no greater than the distance (or maximum round trip delay) corresponding to the ASIC correlator bit limitation (e.g., $\Delta R \leq 39$ miles). Thus, part of cell 34 may be beyond the access range of the ASIC correlator bit limitation in accordance with the subject invention.

The present invention allows base station 30 to detect signals transmitted from mobile-telephones located anywhere in cell 34, including beyond the access range of its ASIC correlator bit limitation (e.g., beyond 39 miles), without ASIC correlator re-design. The present invention is accomplished using a modified timing protocol that will cause search windows and/or base station transmission times to shift with respect to frame boundaries, thereby causing signals transmitted by mobile-telephones positioned beyond the bit limitation of the ASIC correlator to be received within the search windows. This involves transmitting a base station signal at a timer relative to frame boundaries and configuring search windows $W_n$ to begin and end at a time $q$ and $q+p$, respectively, after the time $r$, wherein $q$ is a timing advance value greater than zero representing a propagation delay corresponding to a signal traveling no more than round trip between the base station and the inner radius of cell 34 (i.e., $q$ corresponds to a propagation delay for a distance greater than zero but no more than twice inner radius $R_{inner}$) and $p$ represents a time interval corresponding to the ASIC correlator bit limitation or a time interval over which a mobile-telephone signal may be correlated and thereby detected.

Figure 5:
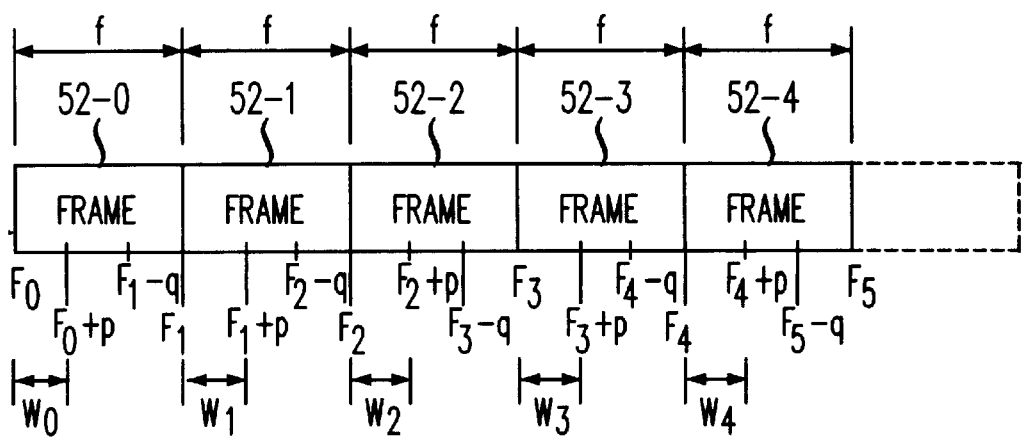
FIG. 5 depicts a timing schedule for a timing protocol used in accordance with one embodiment of the present invention.

In one embodiment, the present invention uses a modified timing protocol incorporating a timing advance technique. FIG. 5 illustrates a timing schedule 50 for a timing protocol used in accordance with this embodiment of the present invention. The timing schedule 50 includes a series of frames 52-n, wherein each frame 52-n spans a time interval $f$ and the beginning of each frame 52-n is marked by a frame boundary at time $F_n$ aligned with GPS time using the GPS receiver. In accordance with this modified timing protocol, base station 30 is configured to begin transmitting base station signals at time $q$ before the frame boundaries (i.e., at times $F_{n-q}$), and search for mobile-telephone signals within search windows $W_n$ spanning from time $F_n$ and ending no later than time $F_n+p$. Likewise, mobile-telephone 38 is configured to begin transmitting signals at some multiple $x$ of a frame time interval (i.e., $fx$) after the mobile-telephones began receiving base station signals, where $x$ is some integer greater than or equal to zero.

Figure 6:
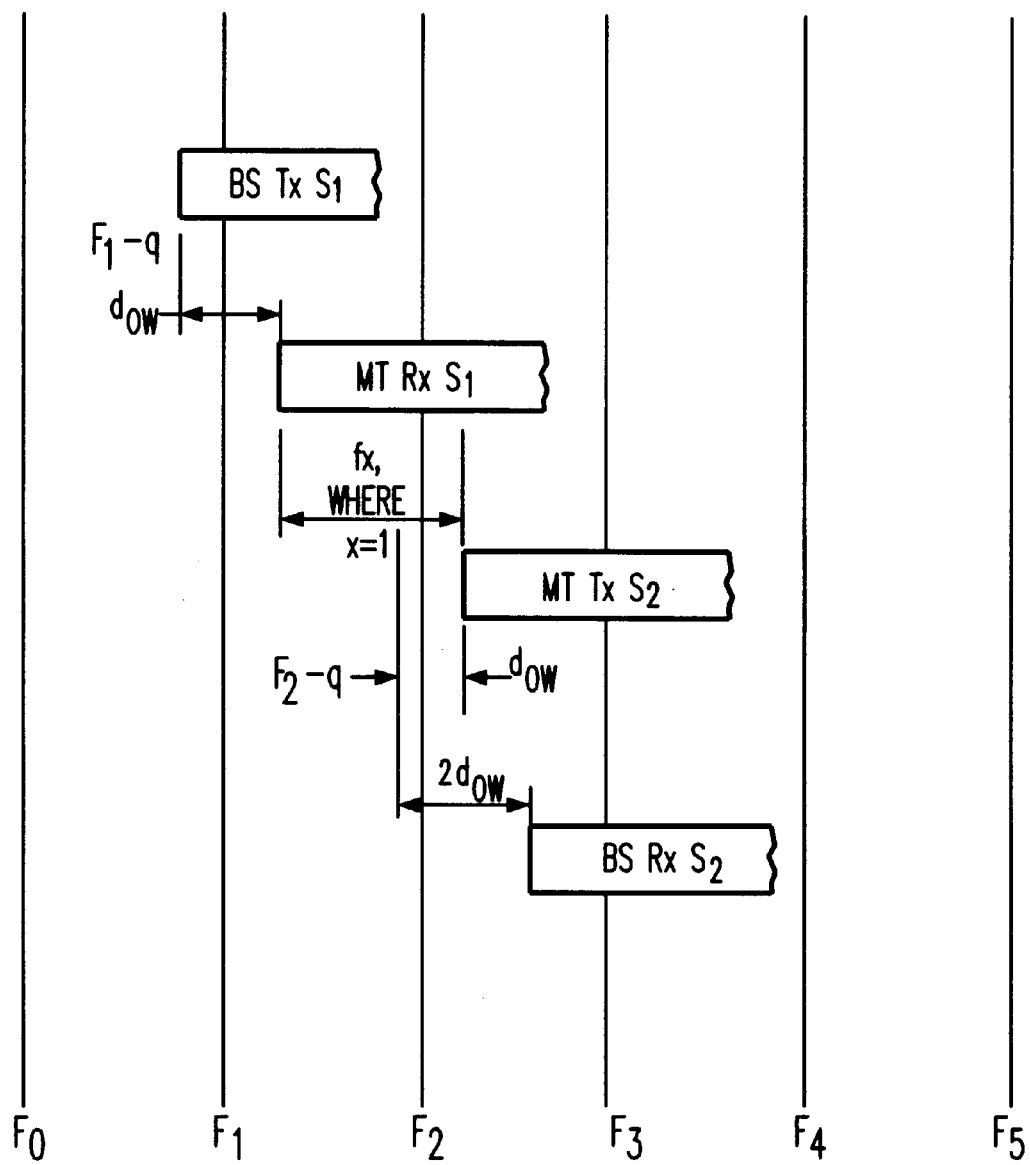
FIG. 6 depicts a time chart illustrating a sequence of transmissions and receptions by a base station and a mobile-telephone located within an extension of a cell.

FIG. 6 depicts a time chart 60 illustrating a sequence of transmissions and receptions in accordance with the timing protocol of FIG. 5 by base station 30 and mobile-telephone 38, which may be located anywhere within cell 34. Base station 30 begins transmitting base station signal $S_1$ at time $F_1-q$. Mobile-telephone 38 begins receiving signal $S_1$ at time $F_1 q+d_{ow}$, where $d_{ow}$ is the one way propagation delay from base station 30 to mobile-telephone 38 (or from mobile-telephone 38 to base station 30). Note that for ease of discussion, the propagation delay from base station 30 to mobile-telephone 38 is assumed to be identical to the propagation delay from mobile-telephone 38 to base station 30. If mobile-telephone 38 transmits a mobile-telephone signal $S_2$ to base station 30, mobile-telephone 38 waits some multiple of a frame time interval (i.e., $fx$) from when mobile-telephone 38 began receiving signal $S_1$ before it begins transmitting signal $S_2$. Thus, mobile-telephone 38 will begin transmitting signal $S_2$ at some time $F_1-q+d_{ow}+fx$ (or time $d_{ow}-q$ after some frame boundary). Because of the propagation delay $d_{ow}$ from mobile-telephone 38 to base station 30, base station 30 will begin receiving signal $S_2$ at some time $F_1-q+d_{ow}+fx+d_{ow}$ (or $F_1-q+2d_{ow}+fx$), which positions the signals to be received between time $F_n$ (i.e., the frame boundary) and time $F_n+p$, where $p=416$ μs corresponding to the ASIC correlator bit limitation (or within the confines of search windows $W_n$). Signal $S_2$ is then detected and processed using techniques well-known in the art. Thus, transmission of signal $S_1$ at time $F_n-q$ by base station 30 will result in the reception of signals transmitted by mobile-telephones 38 within search windows $W_n$ such that the mobile-telephone signals may be detected and demodulated by base station 30 notwithstanding that mobile-telephone 38 is beyond the access range of the ASIC correlator bit limitation.

For example, suppose $R_{inner}$ equals 39 miles and $R_{outer}$ equals 78 miles, then $\Delta R$ equals 39 miles, which is equal to a distance corresponding to a 12 bit ASIC correlator limitation. In this example, base station 30 would begin transmitting at a time $q=416$ μs (i.e., 2×39 miles×5.33 μs/mile) before a frame boundary such that mobile-telephone signals may be received by base station 30 between time $F_n$ and $F_n+p$, where $p=416$ μs corresponding to the ASIC correlator bit limitation (or within the confines of search windows $W_n$).

In another example, suppose cell 34 has an inner radius $R_{inner}$ of 20 miles and an outer radius $R_{outer}$ of 48 miles. Thus, $\Delta R$ is equal to a distance of 28 miles. Since $\Delta R$ is less than 39 miles (or the distance corresponding to the limitation of the 12 bit ASIC correlator), the value of $q$ may be between 96 μs (2×(48−39) miles×5.33 μs/mile) and 213.2 μs (i.e., 2×20 miles×5.33 μs/mile) to ensure or increase the probability that a signal transmitted by a mobile-telephone within cell 34 is received within the confines of search windows $W_n$ beginning at a frame boundary and ending at a time $p=416$ μs after the frame boundary.

Figure 7:
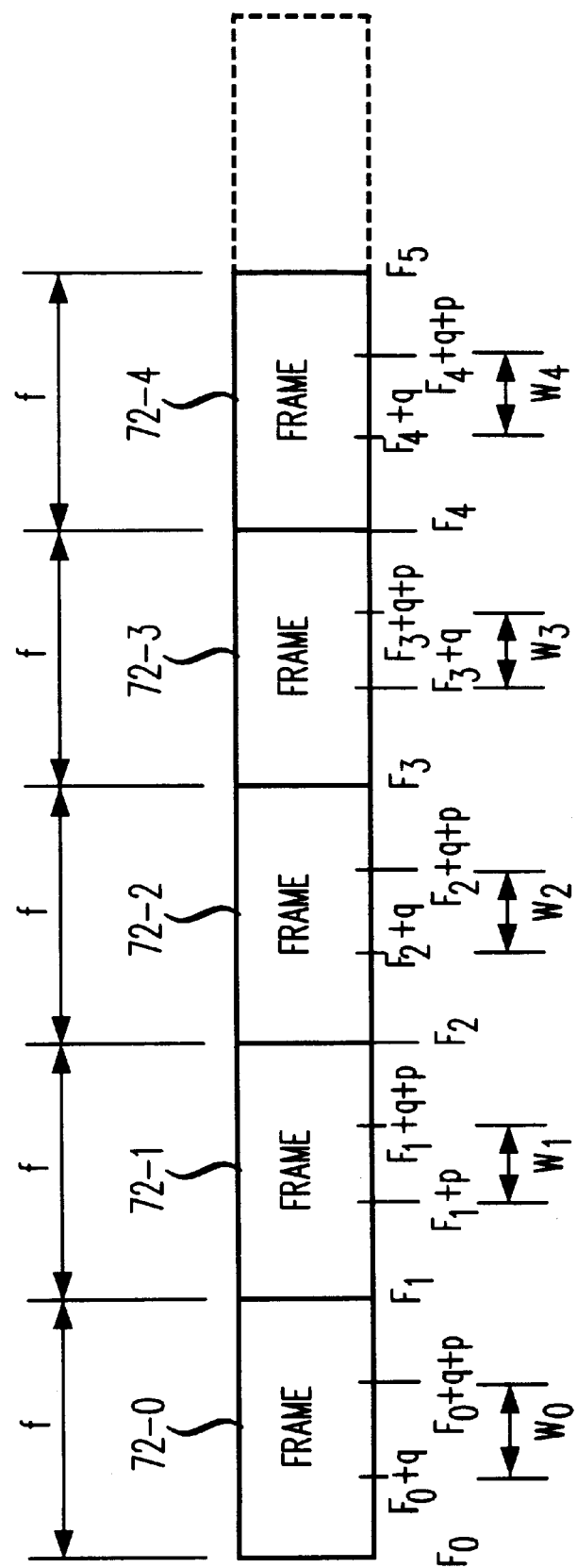
FIG. 7 depicts a timing schedule for a timing protocol used in accordance with another embodiment of the present invention.

In another embodiment of the present invention, base station 30 is operable to detect signals transmitted from mobile-telephone 38 using a modified timing protocol incorporating shifted or offset search windows $W_n$. FIG. 7 illustrates a timing schedule 70 for a timing protocol used in accordance with this embodiment of the present invention. In accordance with the timing schedule 70, base station 30 is configured to begin transmitting signals at the frame boundaries, and search for mobile-telephone signals within shifted search windows $W_n$ spanning from time $F_n+q$ and ending no later than time $F_n+q+p$. Likewise, mobile-telephone 38 is configured to begin transmitting signals at some multiple $x$ of a frame time interval (i.e., $fx$) after the mobile-telephones begin receiving base station signals. Like timing schedule 50, base station 30 using timing schedule 70 will begin to receive signals transmitted from mobile-telephone 38 within the (shifted) search window $W_n$.

It should be noted that a base station incorporating only the modified timing protocol of the present invention may not be able to detect mobile-telephone signals transmitted by mobile-telephones located within a distance $R_{inner}$ of the base station. To be capable of detecting such mobile-telephone signals, the base station should also be incorporating the timing protocol of the prior art.

Although the present invention has been described in considerable detail with reference to certain embodiments, other versions are possible. For example, the present invention is also applicable to wireless communication systems employing other types of multiple access techniques, such as time division multiple access. Therefore, the spirit and scope of the present invention should not be limited to the description of the embodiments contained herein.

We claim:

1. A method for detecting a mobile-telephone signal comprising the steps of:

transmitting a base station signal at a time r relative to a first frame boundary; and receiving the mobile-telephone signal within a search window beginning at a time q after a time r relative to a second frame boundary and ending at a time q+p after the time r relative to the second frame boundary, wherein the mobile-telephone signal was transmitted by a mobile-telephone a time $fx$ after the mobile-telephone began receiving the transmitted base station signal, $f$ is a frame time interval, x is an integer value, q is a timing advance value and p represents a time interval corresponding to a bit limitation for the search window.

2. The method of claim 1 wherein the first frame boundary and the second frame boundary mark a beginning of a same frame.

3. The method of claim 1, wherein the first frame boundary and the second frame boundary do not mark a beginning of a same frame.

4. The method of claim 1 further comprising the step of:

detecting the mobile-telephone signal using a correlator.

5. The method of claim 4, wherein the mobile-telephone signal is detected when a resulting signal of an incoming signal multiplied with a known code exceeds a threshold.

6. A method for detecting a mobile-telephone signal comprising the steps of:

transmitting a base station signal at a time q before a first frame boundary, wherein q is a timing advance value; and receiving the mobile-telephone signal within a search window beginning at a second frame boundary and ending no later than a time p after the second frame boundary, wherein the mobile-telephone signal was transmitted by a mobile-telephone a time $fx$ after the mobile-telephone began receiving the transmitted base station signal, $f$ is a frame time interval, x is an integer value, p represents a time interval corresponding to a bit limitation for the search window.

7. The method of claim 6, wherein the first frame boundary and the second frame boundary mark a beginning of a same frame.

8. The method of claim 6, wherein the first frame boundary and the second frame boundary do not mark a beginning of a same frame.

9. The method of claim 6 further comprising the step of:

detecting the mobile-telephone signal using a correlator.

10. The method of claim 9, wherein the mobile-telephone signal is detected when a resulting signal of an incoming signal multiplied with a known code exceeds a threshold.

11. The method of claim 9, wherein the correlator has a 12-bit limitation.

12. The method of claim 6, wherein the timing advance value q represents a propagation delay corresponding to a signal traveling no more than round trip between a base station and an inner radius of a cell associated with the base station.

13. The method of claim 6, wherein the mobile-telephone signal is transmitted by a mobile-telephone incorporating code division multiple access techniques.

14. The method of claim 6, wherein the base station signal is transmitted by a base station incorporating code division multiple access techniques.

15. A method for detecting a mobile-telephone signal comprising the steps of:

transmitting a base station signal at a first frame boundary; and receiving the mobile-telephone signal within a search window beginning at a time q after a second frame boundary and ending no later than a time q+p after the second frame boundary, wherein the mobile-telephone signal was transmitted by a mobile-telephone a time $fx$ after the mobile-telephone began receiving the transmitted base station signal, $f$ is a frame time interval, x is an integer value, q is a timing advance value and p represents a time interval corresponding to a bit limitation for the search window.

16. The method of claim 15, wherein the first frame boundary and the second frame boundary mark a beginning of a same frame.

17. The method of claim 15, wherein the first frame boundary and the second frame boundary do not mark a beginning of a same frame.

18. The method of claim 15 further comprising the step of:

detecting the mobile-telephone signal using a correlator.

19. The method of claim 18, wherein the mobile-telephone signal is detected when a resulting signal of an incoming signal multiplied with a known code exceeds a threshold.

20. The method of claim 18, wherein the correlator has a 12-bit limitation.

21. The method of claim 18, wherein the timing advance value q represents a propagation delay corresponding to a signal traveling no more than round trip between a base station and an inner radius of a cell associated with the base station.

22. The method of claim 15, wherein the mobile-telephone signal is transmitted by a mobile-telephone incorporating code division multiple access techniques.

23. The method of claim 15, wherein the base station signal is transmitted by a base station incorporating code division multiple access techniques.

* * * * *